United States Patent [19]
Higbee

[11] 3,894,983
[45] July 15, 1975

[54] POLY(ARYLENE SULFIDE) COATING
[75] Inventor: David E. Higbee, Bartlesville, Okla.
[73] Assignee: Phillips Petroleum Company, Bartlesville, Okla.
[22] Filed: June 13, 1973
[21] Appl. No.: 369,608

[52] U.S. Cl. ............................................. 260/37 R
[51] Int. Cl. ........................................... C08g 51/04
[58] Field of Search .................................. 260/37 R

[56] References Cited
UNITED STATES PATENTS
3,622,376  11/1971  Tieszen et al. ............. 260/37 R UX OTHER PUBLICATIONS
Oleesky et al.; Handbook Of Reinforced Plastics; Reinhold Pub. Corp.; 1964; pp. 201–203, 218–219.

Iler; The Colloid Chemistry of Silica and Silicates; Cornell University Press; 197 page; 1955 year; QD 549I4, Sci. Lib.

Primary Examiner—Lewis T. Jacobs

[57] ABSTRACT

Addition of a siliceous material having a particle size of less than 10 microns to a poly(arylene sulfide) coating formulation yields a coating with improved surface characteristics for use as a release coating in conjunction with high temperature molding, extruding, or material handling equipment.

6 Claims, No Drawings

POLY(ARYLENE SULFIDE) COATING

This invention relates to an improved poly(arylene sulfide) coating composition. In another aspect it relates to a poly(arylene sulfide) coated substrate. In still another aspect it relates to an improved method for the release coating of molding and extruding equipment.

The utility of poly(arylene sulfide) as a coating for metal, ceramics, and other surfaces is well known. Poly(arylene sulfides) are also known for their high temperature stability. It has been found that addition of the proper quantity of a finely divided siliceous material to a poly(arylene sulfide) coating material results in a coating which retains the strength and high temperature stability common to poly(arylene sulfide) coatings in general, and exhibits improved surface properties making it desirable for use as a release coating in high temperature applications.

In addition to providing a stable and durable release coating, the present invention provides a means for eliminating die lines or other minor imperfections in molding or forming equipment. The improved release properties of the coating assist in eliminating resin hangups in production machinery thereby reducing maintenance costs as well as reducing the production loss for maintenance and repair time. The improved release properties also cut down on machine purge time and material expense between production runs. With respect to the manufacture of synthetic rubber tires, coating of the tire mold with the composition of the invention eliminates the need for painting the green tire form with a release material prior to molding, eliminates the need for periodic cleaning of the tire mold, substantially reduces tire defects such as folds, almost totally eliminates surface defects in cured tires, and improves the visual appearance of the finished product.

It is an object of this invention to provide an improved poly(arylene sulfide) coating material. Another object is to provide an improved method for coating a substrate with poly(arylene sulfide). Still another object is to provide a new and useful method for release coating of materials. Yet another object is to provide a method for coating a material with a coating having a glossy surface and uniform thickness. Other objects, aspects, and advantages of the invention will be apparent from a study of the specification and the appended claims.

Any normally solid poly(arylene sulfide) can be used in the practice of this invention. The term poly(arylene sulfide) is meant to include not only homopolymers but also arylene sulfide copolymers, terpolymers, and the like, as well as blends of two or more such polymers. Poly(arylene sulfides) which are particularly suited for use in this invention are those having inherent viscosities in chloronaphthalene (0.2 gram polymer in 100 cc chloronaphthalene) at 206° C. of at least about 0.08, preferably between about 0.1 and about 0.3, and more preferably about 0.13 and about 0.23. Examples of suitable polymers are disclosed, for instance, in Edmonds et al. U.S. Pat. No. 3,354,129, Nov. 21, 1967. The presently preferred polymer is poly(phenylene sulfide). Other examples of poly(arylene sulfides) are poly(4,4'-biphenylene sulfide); poly(2,4-tolylene sulfide); a copolymer from P-dichlorobenzene, 2,4-dichlorotoluene, and sodium sulfide; and blends thereof.

In addition, the poly(arylene sulfide) can be blended with other polymers, conventional additives, fillers, extenders, pigments, stabilizers, and the like. Especially preferred fillers are $TiO_2$, $Fe_3O_4$, and fluorocarbon polymers such as polytetrafluoroethylene. Up to about 150 parts by weight, either singly or in combination, of such fillers may be used per 100 parts by weight of poly(arylene sulfide), about 5 to about 80 parts by weight being presently preferred.

In a presently preferred embodiment of the invention, titanium dioxide is mixed with the poly(arylene sulfide) at a concentration within the range of about 0.5 percent to about 100 percent by weight of titanium dioxide based on the weight of poly(arylene sulfide). More preferably, the concentration of titanium dioxide will be within the range of about 10 to about 50 weight percent based on the weight of poly(arylene sulfide). The preferred embodiment also contains from about 0.5 percent to about 75 percent by weight of a fluorocarbon polymer based on the weight of the poly(arylene sulfide). A preferred fluorocarbon polymer is polytetrafluoroethylene, and the preferred concentration thereof is in the range of about 5 to about 35 percent by weight of the poly(arylene sulfide).

In accordance with the invention, the substrate can be any metal, glass, or ceramic material to which poly(arylene sulfide) can be adhered and which can withstand the high temperature required to cure the poly(arylene sulfide) coating. Iron, steel, aluminum, titanium, copper, glass, ceramics, porcelain, and alloys such as nickel steel, bronze, etc., are examples of substrates which can be coated in the manner herein described. The substrate to be coated can be prepared by degreasing, cleaning, and drying the surface to be coated. Cleaning can be accomplished by washing or wiping with trichloroethylene, acetone, or other similar cleaners or solvents, then air drying, wiping the surface dry, or otherwise drying the surface by any suitable method.

The coating composition of the present invention is prepared by combining poly(arylene sulfide) with from about 0.3 percent to about 4 percent by weight of a siliceous material having a particle size of less than 10 microns, preferably less than 5 microns, and more preferably less than 2 microns, including silica; silicates such as calcium silicate and magnesium silicate; aluminosilicates including artificial zeolites and clays such as bentonite, illite, montmorillanite, kaolinite, attapulgite, and talc; and combinations of these. It has been found that concentrations of siliceous material substantially less than 0.3 percent by weight based on poly(arylene sulfide) are generally insufficient to provide the highly desirable surface characteristics and that concentrations substantially in excess of about 4 percent by weight based on poly(arylene sulfide) have a deleterious effect on the bonding strength of the resultant coating. A siliceous material concentration within the range of about 0.4 percent to about 2 percent by weight based on the weight of poly(arylene sulfide) is presently preferred, with a concentration in the range of about 0.5 to about 1 percent by weight based on the weight of poly(arylene sulfide) being more preferred.

While the poly(arylene sulfide) coating can be applied to the substrate in any manner known to the art, a preferred method is to prepare a slurry containing the poly(arylene sulfide) based coating composition, and then to spray coat the substrate with the slurry. Such a spray coating method is conductive to application of a coating of uniform thickness having a smooth, unbroken surface.

When a slurry is employed, any liquid can be used as the diluent provided the liquid is inert to the other components of the slurry and to the substrate, and provided it is readily volatilized prior to or during the subsequent heating or curing treatment. Suitable liquids include water; light hydrocarbons having 5–8 carbon atoms, such as hexane, isooctane, and pentane; benzene; toluene; petroleum ether; alcohols or glycols having 1–4 carbon atoms, such as ethanol, propanol, i-propanol, ethylene glycol, butanol-1, and propylene glycol; or mixtures thereof. A wetting agent, usually a nonionic material such as alkylphenoxypolyethoxy alcohol, in the proportion of about 0.5 percent to about 1 percent by weight based on water can be used. Other suitable wetting agents are octylphenoxypolyethoxy ethanol, aliphatic polyethers, nonylphenylpolyethylene glycol ether, and trimethylnonylpolyethylene glycol ether. A mixture of water and propylene glycol is presently preferred. Use of a diluent containing 60 volume percent water and 40 volume percent propylene glycol has yielded excellent results. A high ratio of glycol to water prevents premature volatilization of the diluent so that boundaries can be clearly delineated and overspraying can be avoided or minimized by the ready coalescence of boundary areas.

Preparation of a suitable slurry can be accomplished in any manner known to the art. It has been found that a suitable slurry can be obtained by ball milling the poly(arylene sulfide), siliceous material, other additives, and diluent for a period of time within the range of about 2 to about 48 hours. The concentration of the polymer in the carrier liquid depends upon the particular method of coating application and whether or not additional solids are employed. As a practical matter, the slurry would not be so dilute that the polymer particles are not closely enough associated to permit them to fuse together on melting. On the other hand, the thickness of the slurry and its ease of application will impose a practical upper limit on the solids concentration. Generally, a solids content within the range of about 10 to about 60 weight percent can be used, and best results are obtained with a slurry that contains about 25 to about 40 weight percent solids based on the weight of the total slurry.

The slurry is preferably sprayed onto the substrate without prior heat treatment of the substrate, but the substrate may be heated to a temperature of at lease 400° F., more preferably between about 600° and about 800° F., prior to application of the coating. If the substrate is heated prior to slurry application, it is preferably maintained at a temperature high enough to fuse the polymer on contact during the coating operation.

After the coating has been applied, the coating is cured by heating at a temperature in the range of about 500° to about 900° F., in an oxygen-containing atmosphere, such as air, for a time in the range of about 5 minutes to about 12 hours or more. The thickness of the coating can be increased by additional applications following the same procedure after each curing. Coating thicknesses of about 0.5 to about 50 mils can easily be applied. Coatings having thicknesses of about 0.5 to about 30 mils are satisfactory for most uses.

EXAMPLE 1

A slurry was prepared by combining 3 parts by weight poly(phenylene sulfide) with 1 part by weight titanium dioxide, 20 percent by weight of polytetrafluoroethylene based on the weight of poly(phenylene sulfide), and 1 percent by weight of bentonite based on the weight of poly(phenylene sulfide), and a liquid comprising 60 volume percent water and 40 volume percent propylene glycol, in a ratio of 28 parts by weight of solids to 72 parts by weight of liquid. The slurry was then ball milled for a period of 24 hours. The extruder mandrel and head of a blow molding machine were spray coated with the slurry to a thickness of 5 mils. The coated surfaces were then cured at 700° F. for 2 hours. A coating of uniform thickness and having a smooth, high gloss finish was obtained which readily released plastic remainders after operating at 425° F. for several hours.

Additional tests using the above procedure but varying the proportion of bentonite disclosed that a concentration of bentonite of 0.25 percent by weight based on the weight of poly(phenylene sulfide) was generally ineffective in improving the release properties and surface characteristics of the coating and that a concentration of bentonite of 5 percent by weight based on the weight of poly(phenylene sulfide) has a deleterious effect on the bonding strength of the coating to the substrate.

EXAMPLE II

A 10.00 × 20 truck tire mold was coated with a 1 mil thick release coating using a slurry of poly(phenylene sulfide), 25 percent by weight of titanium dioxide based on the weight of poly(phenylene sulfide), and 18.8 percent by weight of polytetrafluoroethylene based on the weight of poly(phenylene sulfide). The coating composition did not contain any of the finely divided siliceous material used in the invention. The coating was cured at a temperature of 700° F. for 3 hours. The coated mold was then tested under actual operating conditions to determine the effectiveness and durability of the coating composition. Although the coated surface of the mold began to show an accumulation of rubber products after releasing its first 1000 tires, operation of the mold was continued as long as it produced an acceptable product so that some measure of the useful life of the coating could be obtained. The mold successfully demonstrated the endurances of the poly(phenylene sulfide) coating by producing several thousand more tires without being cleaned and without producing any tires which were unsuitable by reason of mold sticking. The surface of the tires produced by this mold was considered to be suitable only for truck, tractor, and heavy equipment tires, however, due to the roughened appearance of the finished surface of the tires.

EXAMPLE III

A slurry was prepared by combining 4 parts by weight poly(phenylene sulfide) with 1 part by weight titanium dioxide, 20 percent by weight of polytetrafluoroethylene based on the weight of poly(phenylene sulfide), and ½ percent by weight of bentonite based on the weight of poly(phenylene sulfide) and a liquid comprising one part by volume water, one part by volume propylene glycol, and 0.5 percent by weight octylphenoxypolyethoxy ethanol based on the weight of water, in a ratio of 27 parts by weight of solids to 73 parts by weight of liquid. The slurry was then ball milled for a period of 48 hours. A 10.00 × 22 tire mold was spray coated with the slurry to apply a 1 mil thick coating to the mold, and the coated mold was cured at 700° F. for 3 hours. Visual inspection of the coating showed that, compared to similar coatings not containing any finely divided siliceous material, the addition of bentonite caused a decrease in the number and magnitude of surface imperfections and resulted in a smooth, high gloss surface. The mold was then tested under actual operating conditions to determine the effectiveness and durability of the coating composition. After producing several thousand tires without being cleaned, the mold continued to produce tires having a high quality surface suitable for passenger car tires, showed no sign of rubber product sticking, and, due to the particularly good release properties of the coating, accumulated little or no rubber product on the release surface.

Reasonable variations and modifications are possible within the scope of the foregoing disclosure and the appended claims to the invention.

I claim:

1. A composition comprising a normally solid poly(arylene sulfide) and from about 0.3 percent to about 4 percent by weight based on the weight of poly(arylene sulfide) of a finely divided siliceous material having a particle size less than about 10 microns.

2. The composition of claim 1 wherein said siliceous material is selected from the group consisting of silica, silicates, alumino-silicates, and combinations thereof.

3. The composition of claim 2 wherein said poly(arylene sulfide) is poly(phenylene sulfide).

4. The composition of claim 3 additionally comprising from about 0.5 percent to about 100 percent by weight titanium dioxide based on the weight of poly(phenylene sulfide) and from about 0.5 percent to about 75 percent by weight of a fluorocarbon polymer based on the weight of poly(phenylene sulfide).

5. The composition of claim 4 wherein said fluorocarbon polymer is polytetrafluoroethylene, wherein the particle size of said siliceous material is less than about 2 microns, and wherein said composition contains from about 10 to about 50 weight percent titanium dioxide, from about 5 to about 35 weight percent polytetrafluoroethylene, and from about 0.4 to about 2 weight percent siliceous material based on the weight of poly(phenylene sulfide).

6. The composition of claim 5 wherein said siliceous material is bentonite clay.

* * * * *